(12) United States Patent
Masahiro et al.

(10) Patent No.: US 8,503,874 B2
(45) Date of Patent: Aug. 6, 2013

(54) APPARATUS FOR IMAGING THREE-DIMENSIONAL IMAGE

(75) Inventors: Takashima Masahiro, Seoul (KR); Tae-kyung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 72 days.

(21) Appl. No.: 13/302,595

(22) Filed: Nov. 22, 2011

(65) Prior Publication Data

US 2012/0134658 A1 May 31, 2012

(30) Foreign Application Priority Data

Nov. 25, 2010 (KR) .................. 10-2010-0117963

(51) Int. Cl.
*G03B 35/00* (2006.01)
(52) U.S. Cl.
USPC .......................................... 396/326; 396/348
(58) Field of Classification Search
USPC .................................. 396/326, 348
See application file for complete search history.

(56) References Cited

U.S. PATENT DOCUMENTS

| 5,778,268 | A | * | 7/1998 | Inaba .............................. 396/326 |
| 5,940,641 | A | * | 8/1999 | McIntyre et al. ............. 396/332 |
| 6,144,809 | A | * | 11/2000 | Inaba .............................. 396/326 |
| 6,278,480 | B1 | * | 8/2001 | Kurahashi et al. ............... 348/59 |
| 6,512,892 | B1 | | 1/2003 | Montgomery et al. |
| 6,864,911 | B1 | * | 3/2005 | Zhang et al. ..................... 348/42 |
| 2001/0017983 | A1 | * | 8/2001 | Tanaka .......................... 396/348 |
| 2012/0120202 | A1 | * | 5/2012 | Yoon et al. ....................... 348/49 |
| 2012/0134658 | A1 | * | 5/2012 | Masahiro et al. .............. 396/326 |
| 2012/0140045 | A1 | * | 6/2012 | Masahiro et al. ............... 348/49 |

FOREIGN PATENT DOCUMENTS

JP 3674275 7/2005
KR 100421170 3/2004

* cited by examiner

*Primary Examiner* — W B Perkey
(74) *Attorney, Agent, or Firm* — The Farrell Law Firm, P.C.

(57) ABSTRACT

A three-Dimensional (3D) imaging apparatus is provided. The 3D imaging apparatus includes a first member including a first region and a second region therein; at least one second member movably coupled to the first member such that the at least one second member is movable out of and into the second region; a plurality of lens units disposed in the first region while the at least one second member is disposed in the second region, wherein, when the at least one second member moves out of the second region, at least one of the plurality of the lens units moves from the first region into the second region.

20 Claims, 9 Drawing Sheets

FIG. 1
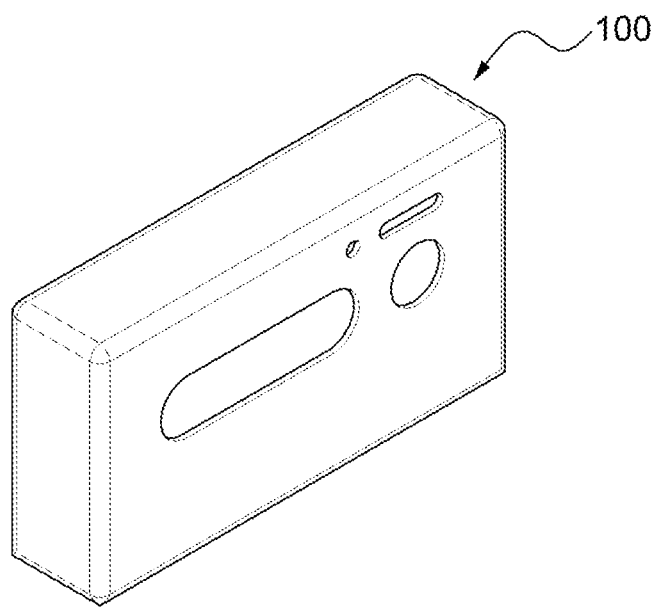
(a)
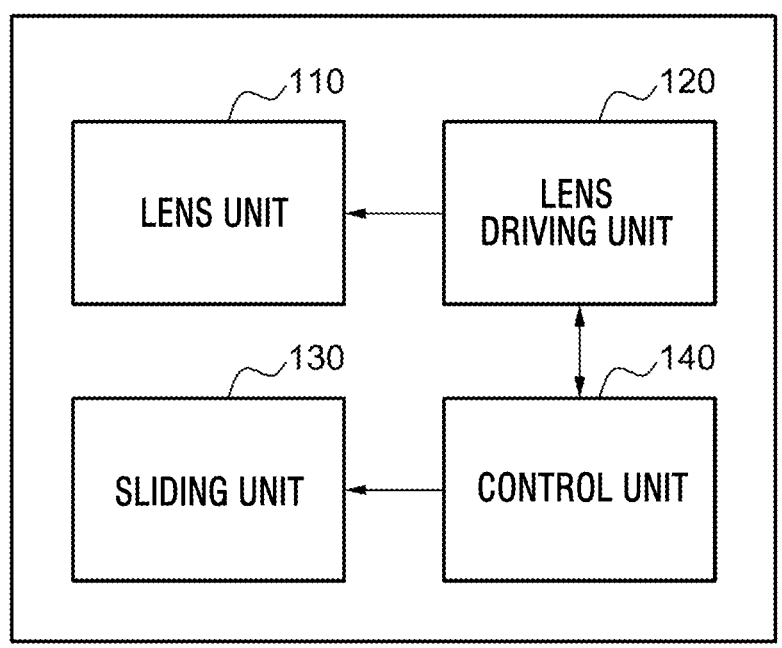
(b)

FIG. 8
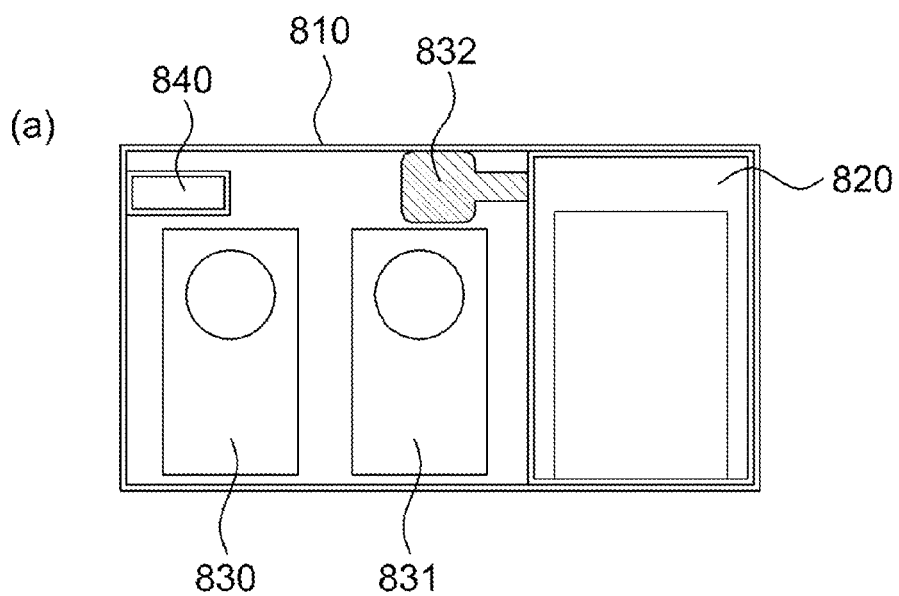
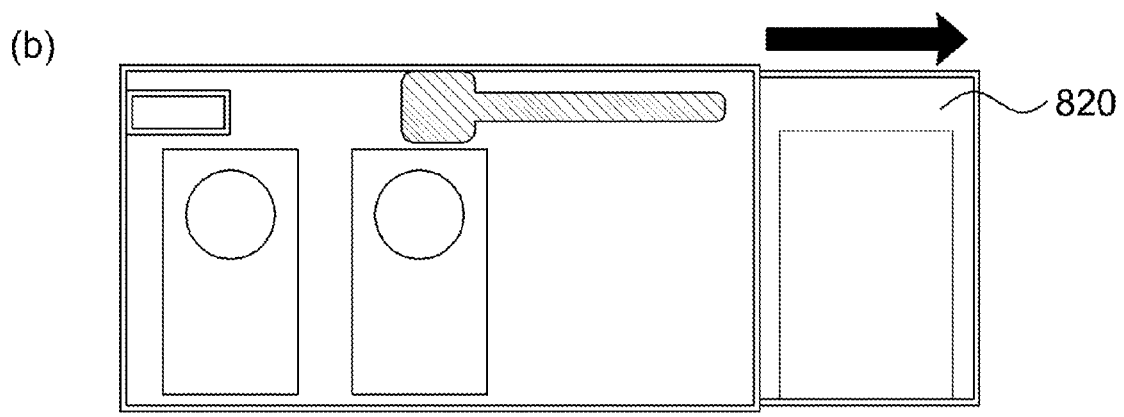

APPARATUS FOR IMAGING THREE-DIMENSIONAL IMAGE

PRIORITY

This application claims priority 35 U.S.C. §119 (a) to a Korean Patent Application No. 2010-0117963 filed on Nov. 25, 2010 in the Korean Intellectual Property Office, the entire content of which is incorporated herein by reference.

BACKGROUND OF THE INVENTION

1. Field of the Invention

The present invention relates generally to a three-Dimensional (3D) imaging apparatus, and, in particular, to a 3D imaging apparatus for securing a movement space of a lens.

2. Description of the Related Art

Three-dimensional (3D) imaging technology can be applied to various fields such as information communication, broadcasting, medical care, educational training, military, game, animation, virtual reality, CAD, and industrial technologies.

In general, a human perceives a complex 3D effect by varying the thickness of eye lenses based on a location of an observed object, angles between each of the eyes and the object, location and shape differences of the object perceived by left and right eyes, parallax according to movement of the object, psychology, and memory effect.

Binocular disparity resulting from the horizontal separation of about 6 to 7 cm between a human's two eyes can be one important factor of the stereoscopic 3D effect. In particular, the human sees the object with the angle difference according to the binocular disparity, and therefore, the images coming into the eyes are different from each other. These two images are input to the brain through the retinas, and the brain can perceive a 3D image by accurately uniting the information from these two images.

A 3D imaging apparatus for acquiring a left-eye image and a right-eye image for one object using two optical lens systems can be used to obtain a 3D image.

Such a 3D imaging apparatus may include a left-eye lens unit and a right-eye lens unit. To correct the disparity of the 3D image obtained by the 3D imaging apparatus, a component for moving at least one of the left-eye lens unit and the right-eye lens unit, relative to the other lens unit, can be included.

In order to enable movement of at least one of the left-eye lens unit and the right-eye lens unit, the size of the 3D imaging apparatus can increase. However, there remains a need for miniaturized imaging apparatuses.

SUMMARY OF THE INVENTION

Accordingly, the present invention is provided to address the above-mentioned and/or other problems and disadvantages. An aspect of the present invention provides a 3D imaging apparatus for securing a space where at least one lens unit moves.

Additional aspects and/or advantages of the invention will be set forth in part in the description which follows and, in part, will be clear from the description.

According to an aspect of the present disclosure, a three-Dimensional (3D) imaging apparatus includes a first member including a first region and a second region therein; at least one second member movably coupled to the first member such that the at least one second member is movable out of and into the second region; a plurality of lens units disposed in the first region while the at least one second member is disposed in the second region, wherein, when the at least one second member moves out of the second region, at least one of the plurality of the lens units moves from the first region into the second region.

BRIEF DESCRIPTION OF THE DRAWINGS

The above-described and/or other aspects and advantages of the present general inventive concept will become apparent and more readily appreciated from the following description of embodiments of the present invention, taken in conjunction with the accompanying drawings of which:

FIG. 1A is a diagram illustrating a perspective view of a 3D imaging apparatus according to an embodiment of the invention;

FIG. 1B is a structural diagram illustrating the 3D imaging apparatus of FIG. 1A;

FIGS. 8A and 8B are diagrams illustrating a 3D imaging apparatus in which a second member separates from a first member according to power on and off according to an embodiment of the invention.

DETAILED DESCRIPTION OF EMBODIMENTS OF THE PRESENT INVENTION

Figure 2:
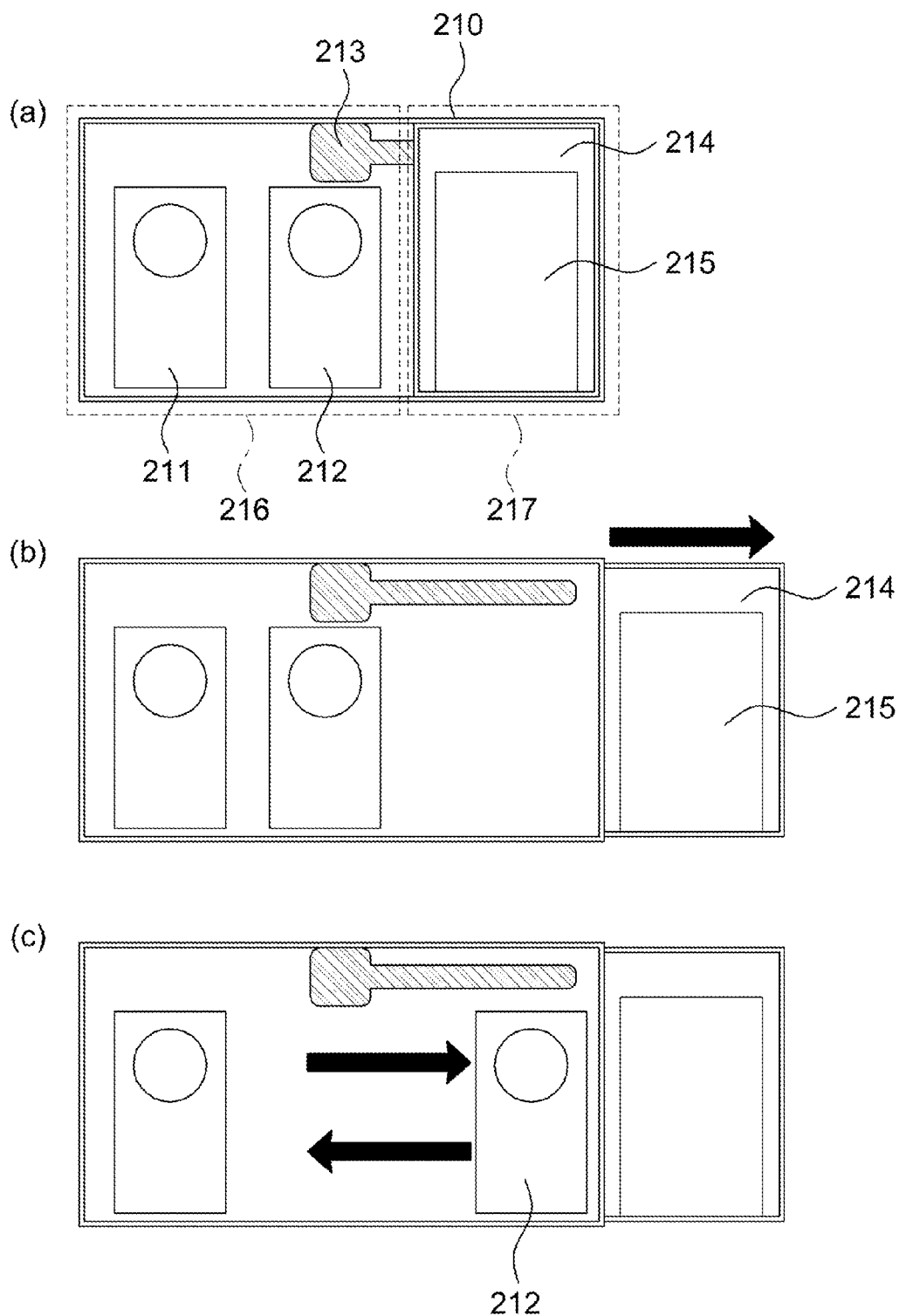
FIGS. 2A, 2B, and 2C are diagrams illustrating a 3D imaging apparatus in which a second member separates and moves from a first member according to an embodiment of the invention.

Embodiments of the present invention will now be described in detail, with reference to the accompanying drawings, wherein like reference numerals refer to the same or similar elements. The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

FIG. 1A is a perspective diagram illustrating a 3D imaging apparatus according to an embodiment of the present invention, and FIG. 1B is a structural diagram of the 3D imaging apparatus.

Referring to FIGS. 1A and 1B, the 3D imaging apparatus 100 includes a lens unit 110, a lens driving unit 120, a sliding unit 130, and a control unit 140.

The lens unit 110 may include an optical sensor for detecting light, and/or a circuit for processing a signal from the optical sensor.

The lens unit 110 can include a plurality of lenses, which may include a zoom-lens.

Light incident to the lens unit 110 is collected at a sensor (not shown), and the collected light can be represented as a 3D image by a display unit (not shown) under a control of the control unit 140.

The lens unit 110 includes a lens-set formed with a plurality of lenses, a plurality of lenses including a left-eye lens or a right-eye lens, or one of lenses including a plurality of lens-sets. Any of the single lenses may include a beam splitter for dividing the image inside the single lens, and a sensor for collecting the divided image. A 3D image can be obtained by using the beam splitter and the sensor.

The lens unit 110 may include a left-eye lens unit for capturing a left-eye image and a right-eye lens unit for capturing a right-eye image. The captured left-eye and right-eye images can be represented as the 3D image in the display unit under control of the control unit 140.

The lens driving unit 120 may include an actuator, a shaft, and a position sensor (not shown). The lens driving unit 120 can control the movement of the lens unit 110 to adjust the disparity of the 3D image, and control to obtain the image within an allowed range of the lens unit 110.

Using the actuator, the lens driving unit 120 can move the lens unit 110 supported by the shaft in an arrangement direction of the shaft. The lens driving unit 120 can obtain information indicating a movement amount of the lens unit 110 and/or a position of the lens unit 110 using the position sensor.

The sliding unit 130 may be placed within the 3D imaging apparatus 100, and may be separated from the 3D imaging apparatus 100 according to a user's operation. When the sliding unit 130 is removed from the inside of the 3D imaging apparatus 100, the movement space of the lens unit 110 for adjusting the disparity of the 3D image can be secured.

To obtain an optimal 3D image based on the 3D image data obtained by the lens driving unit 120, the control unit 140 can control the movement of the lens unit 110 by sending a signal to the lens driving unit 120.

The control unit 140 controls the movement of the sliding unit 130 according to a user's operation, a gesture, or an input signal. The control unit 140 controls the 3D imaging apparatus 100 according to the signal input through the display unit, and controls the display unit to display the 3D image obtained through the lens unit 110.

The display unit displays the obtained 3D image, and may also display the user's input and/or a phrase for selecting an item. The user's input signal, such as a signal indicating a selection of an item displayed in the display unit, is sent to the control unit 140, and the control unit 140 controls the 3D imaging apparatus 100 according to the input signal.

FIGS. 2A and 2B is a diagram illustrating a 3D imaging apparatus in which a second member separates and moves from a first member according to an embodiment of the invention, and includes sectional views of the 3D imaging apparatus of FIG. 1. In particular, FIG. 2A depicts a state before the second member moves, FIG. 2B depicts a state when the second member moves, and FIG. 2C depicts the state when a left-eye lens unit moves.

Referring to FIG. 2A, the 3D imaging apparatus 100 according to an embodiment of the invention includes a first member 210 and a second member 214. For example, the first member 210 can be a case of the 3D imaging apparatus 100. The first member 210 may include a left-eye lens unit 211, a right-eye lens unit 212, an actuator 213, and a power device (not shown).

The left-eye lens unit 211 captures a left-eye image, the right-eye lens unit 212 captures a right-eye image, and the 3D imaging apparatus 100 may display the combined left-eye image and right-eye image as a 3D image.

The actuator 213 moves at least one of the left-eye lens unit 211 and the right-eye lens unit 212.

The first member 210 includes the actuator 213 and a shaft (not shown), and at least one of the left-eye lens unit 211 and the right-eye lens unit 212 can be supported by the shaft and thus moved.

For linear motion of at least one of the left-eye lens unit 211 and the right-eye lens unit 212 supported by the shaft for the rotational motion of the actuator 213, the first member 210 may include a rack gear and a pinion gear (not shown). One of the rack gear and the pinion gear is connected to the actuator 213, and the other of the rack gear and pinion gear is connected to at least one of the left-eye lens unit 211 and the right-eye lens unit 212.

Using the actuator 213, the control unit 140 can regulate the disparity between the left-eye image and the right-eye image.

The second member 214 is the sliding unit 130 of FIG. 1B. A housing space 215 is formed in the second member 214. Any one of a power unit, a condenser, a circuit device, and a memory card slot unit may be placed in the housing space 215. The housing space 215 can accommodate a large portion the parts of the 3D imaging apparatus 100, thus reducing the size of the 3D imaging apparatus 100.

When the second member 214 is in the first member 210 and moves, the space for moving at least one of the left-eye lens unit 211 and the right-eye lens unit 212 can be secured, to thus reduce the size of the 3D imaging apparatus 100. When the second member 214 moves away from the first member 210, a part of the housing space 215 also separates and the space of a second region 217 can be secured.

When the space of the second region 217 is secured, the distance between the left-eye lens unit 211 and the right-eye lens unit 212 can be regulated and the disparity of the images obtained through the left-eye lens unit 211 and the right-eye lens unit 212 can be controlled. More specifically, when the 3D imaging apparatus 100 is not used, the 3D imaging apparatus 100 can be miniaturized by using of the housing space 215 formed in the second member 214. When the 3D imaging apparatus 100 is used, the second member 214 moves away to provide the space for moving at least one of the left-eye lens unit 211 and the right-eye lens unit 212.

To improve the grip of the user, the second member 214 can include a groove and/or a rubber outer layer. The second member 214 may further include an additional component for assisting the user in gripping the 3D imaging apparatus 100. To secure the space for moving at least one of the left-eye lens unit 211 and the right-eye lens unit 212, the control unit 140 can control the movement of the second member 214.

The first member 210 includes a first region 216 and the second region 217. The first region 216 accommodates the left-eye lens unit 211, the right-eye lens unit 212, and the actuator 213.

The second region 217 accommodates the second member 214 when the 3D imaging apparatus 100 is not used. The second region 217 further includes a space for moving at least one of the left-eye lens unit 211 and the right-eye lens unit 212.

Since at least one of the left-eye lens unit 211 and the right-eye lens unit 212 moves from the first region 216 to the second region 217, the shaft extends from the first region 216 to the second region 217.

Depending on the designed structure of the 3D imaging apparatus 100, various components housed in the first region 216 and the second region 217 can change in accordance with embodiments of the present invention.

Before the second member 214 separates from the first member 210, the housing space 215 can be disposed above the shaft. When the second member 214 moves away from the first member 210, the housing space 215 moves, the shaft hidden by the housing space 215 appears, and at least one of the left-eye lens unit 211 and the right-eye lens unit 212 can move along the shaft.

When the second member 214 moves away from the first member 210, a full range from a minimum distance to the maximum distance between the left-eye lens unit 211 and the right-eye lens unit 212 can be attained.

Hereafter, operations of the 3D imaging apparatus 100 are described with reference to FIGS. 2A, 2B, and 2C.

Referring to FIG. 2A, the left-eye lens unit 211 and the right-eye lens unit 212 are included in the first region 216, and the second member is disposed in the second region 217. As shown in FIG. 2B, the second member 214 separates from the first member 210. At this time, the extra space corresponding to the separation of the second member is provided in the first member.

According to the separation of the second member, the size of 3D imaging apparatus 100 can be increased into a size more appropriate size for a user's grip. Conversely, when the second member 214 returns to the first member 210, the 3D imaging apparatus 100 can be reduced to an adequate portable size for the user.

As shown in FIG. 2C, after the second member 214 is moved away from the first member 210, the right-eye lens unit 212 can move to the second region 217, and the control unit 140 can control the sequential movement of the second member 214 and the right-eye lens unit 212, in order to prevent collision between these elements. For example, the second member and the right-eye lens unit can move collinearly.

While FIG. 2 shows the movement of the right-eye lens unit 212, either of or both of the left-eye lens unit 211 ad the right-eye lens unit 212 can move in accordance with other embodiments of the present invention.

When the second member 214 moves to separate from the first member 210, at least one of the left-eye lens unit 211 and the right-eye lens unit 212 can be moved to a designated driving position. The driving position can be a position for minimizing the distance between the left-eye lens unit 211 and the right-eye lens unit 212, a position for maximizing the distance, or a middle position between the position of the minimum distance and the position of the maximum distance.

When the second member 214 moves back into the second region 217, at least one of the left-eye lens unit 211 and the right-eye lens unit 212 can move to a designated initial position. The initial position can be a position for minimizing the distance between the plurality of the lens units, for example. By controlling at least one of the left-eye lens unit 211 and the right-eye lens unit 212, the control unit 140 can regulate the driving position or the initial position.

As shown in FIGS. 2A, 2B, and 2C, the left-eye lens unit 211 including a left-eye lens (not shown) and the right-eye lens unit 212 including a right-eye lens (not shown) may spaced apart at various distances. The distance between the left-eye lens unit 211 and the right-eye lens unit 212 is referred to as an Inter Camera Distance (ICD).

The left-eye sensor captures the left-eye image coming through the left-eye lens. The right-eye sensor captures the right-eye image coming through the right-eye lens. The left and right-eye images are controlled by the control unit 140. The left-eye image and the right-eye image are obtained and displayed in the display unit in real time.

The actuator 213 controls the movement of the left-eye lens unit 211 and the movement of the right-eye lens unit 212. During or after the movement of the left-eye lens unit 211 and/or the right-eye lens unit 212, the 3D imaging apparatus 100 can capture the left-eye image and the right-eye image.

The control unit 140 can regulate the ICD by controlling the actuator 213, and capture the left-eye image and the right-eye image with less fatigue and producing a high-quality 3D effect using the regulated ICD.

A still image may be captured in the regulated ICD, and the ICD can be fixed for video capture. As the actuator is adjusted in real time to change the ICD according to scene transitions. Information indicating the ICD can be displayed in the display unit, and a user can automatically or manually adjust the ICD in the 3D imaging apparatus 100.

By minimizing color, Auto Exposure (AE), Auto White Balance (AWB), or geometric difference of the left-eye image and the right-eye image, the control unit 140 can generate a natural-looking 3D image when the 3D image created with the left-eye image and the right-eye image.

The control unit 140 can calculate a maximum disparity, a minimum disparity, a disparity of a particular object, or feature points in the left-eye image and the right-eye image, and thus control the 3D image with less fatigue and a high-quality 3D effect.

When the 3D imaging apparatus 100 has an image difference corresponding to the lens itself and an image difference corresponding to the sensor included in the lens, the images may not match. It is necessary to match the images by signal-processing one image based on the other image.

A geometric difference such as lens difference or sensor difference in each of the left-eye lens unit 211 and the right-eye lens unit 212, can cause an inconsistency of feature points in the left-eye image and the right-eye image. For example, when there is a zoom difference in the left-eye lens unit 211 relative to the right-eye lens unit 212, objects in the left-eye and right-eye images may have different sizes.

The geometric difference is hard to find in a 2D imaging apparatus but frequently observed in the 3D imaging apparatus. As the geometric difference decreases, image fatigue can decrease and the quality of the 3D effect can improve. The control unit 140 can minimize the geometric difference using shift, crop, resize, or affine transformation between the left-eye image and the right-eye image.

The left-eye lens unit 211 and the right-eye lens unit 212 of the 3D imaging apparatus 100 function similarly to the eyes of a human. The image formed in the left eye or the right eye of the human is combined in the brain so that the human can perceive the 3D effect. Similarly, the 3D imaging apparatus 100 can include the left-eye lens unit 211 and the right-eye lens unit 212 corresponding to the left eye of the human or the right eye of the human, capture the left-eye image through the left-eye lens unit 211, and capture the right-eye image through the right-eye lens unit 212.

The captured left-eye image and right-eye image can be displayed in the display unit in various manners, such as showing only the left-eye image or the right-eye image to the left and right eyes, respectively, of a user. Hence, the left-eye and right-eye images can be combined in the brain of the human, and the human can sense the 3D effect similar to the actual 3D image, in the combined left-eye and right-eye images.

One of reasons of the 3D effect from the left-eye image and the right-eye image is the disparity between the two images or a parallax. The parallax is the view-point difference because the positions of the left-eye lens unit 211 and the right-eye lens unit 212 are not the same but spatially separated from each other. More specifically, the locations the same object formed in the left-eye sensor and the right-eye sensor are different from each other. In general, far objects have a small disparity, and the near objects have a larger disparity. By calculating the disparity information, the control unit 140 can process the 3D image with less fatigue and produce a high-quality good 3D effect.

According to an input mode, the 3D imaging apparatus 100 can use either or both of the left-eye lens and the left-eye sensor, or the right-eye lens and the right-eye sensor. At least one of the left-eye lens and the right-eye lens moves to minimize the disparity of the 3D image and to increase the 3D effect.

Another important factor for the 3D effect, in addition to the parallax, is convergence. Convergence refers to the left-eye lens and the right-eye lens focusing on the same object in the 3D image. When convergence on the object is achieved, the point of the object is a convergence point and the angle between the left-eye lens and the right-eye lens is a convergence angle. The convergence point indicates the point of the minimum disparity. The position of the object focused upon by the left-eye lens and the right-eye lens when the 3D imaging apparatus 100 views the 3D image is the convergence point.

The convergence angle is the angle between the left-eye lens and the right-eye lens. In general, a small convergence angle corresponds to distant objects, and while a larger convergence angle corresponds to nearby objects.

The control unit 140 can determine the distance of the object by calculating the angle information, and calculate the 3D effect of the object based on the distance. Due to these calculations, the disparity value of the left-eye image and the right-eye image of the object is minimized, the 3D image of the object lessens the fatigue and enhances the 3D effect. When the object is the convergence point, the disparity value of the object is zero and the location of the displayed object appears to be on the display unit itself, when viewed by a user.

An operating method of the 3D imaging apparatus 100 including the second member 214 according to an embodiment of the present invention is described as follows. First the 3D imaging apparatus 100 is turned on, and the 3D imaging apparatus 100 secures a space 217 for moving the right-eye lens unit 212 by separating the second member 214 from the first member 210.

Then, the disparity of the images is obtained through the left-eye lens unit 211 and the right-eye lens unit 212. Next, the distance for moving the right-eye lens unit 212 is calculated according to the obtained disparity. After the distance is calculated, the right-eye lens unit 212 is moved into the secured space 217 according to the calculated movement distance and then the 3D imaging apparatus captures the final image, and displays the final image in the display unit.

FIGS. 3A, 3B, and 3C is a diagram illustrating another D imaging apparatus in which a second member separates and moves from a first member according to an embodiment of the present invention.

Figure 3:
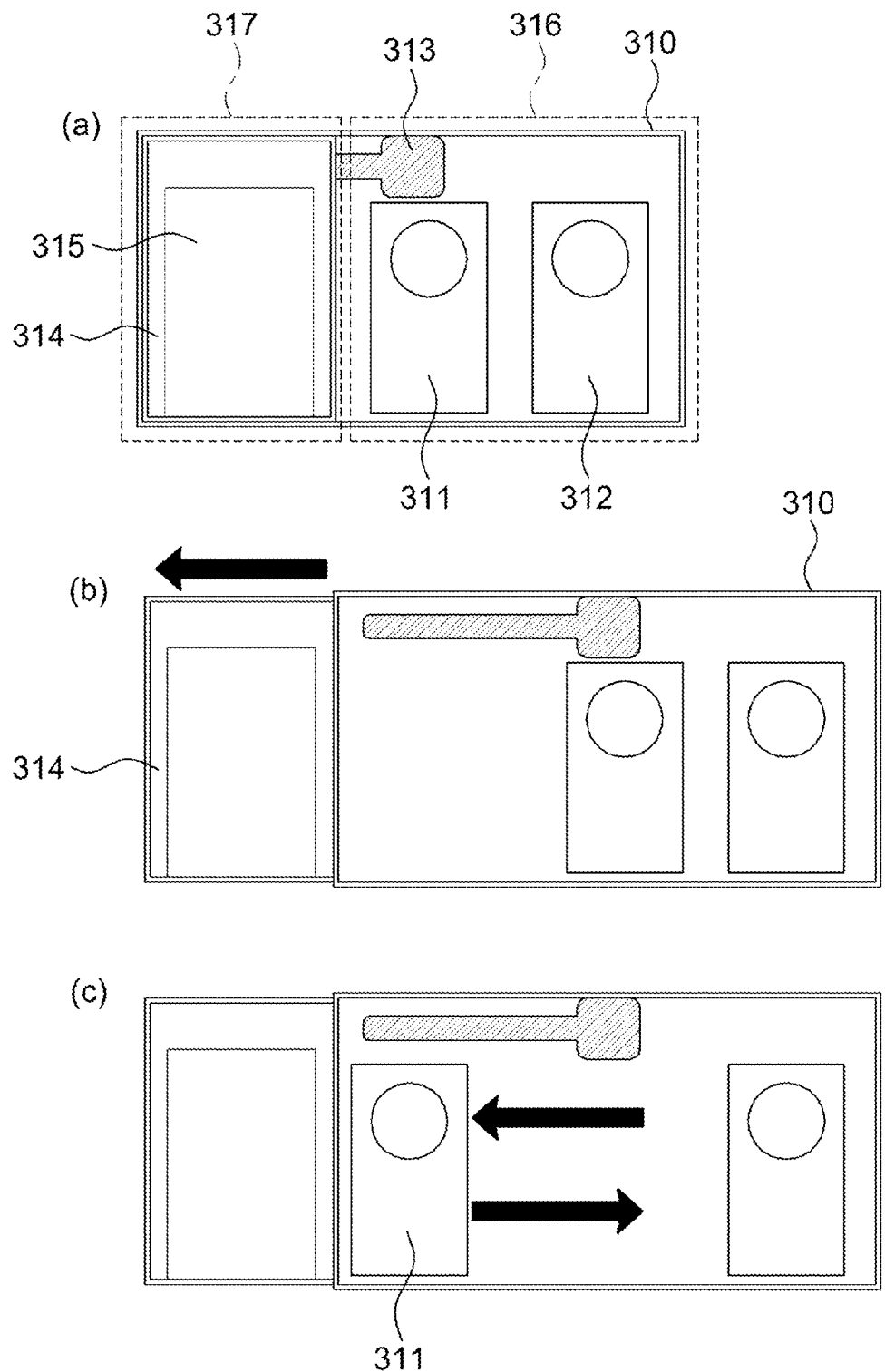
FIGS. 3A, 3B, and 3C are diagrams illustrating another 3D imaging apparatus in which a second member separates and moves from a first member according to an embodiment of the invention.

Referring to FIG. 3, the position of the second member 314 is different from the position of the second member 214 of FIG. 2. In a manner similar to that shown in FIG. 2A, FIG. 3A is a sectional view illustrating a 3D image device 100 in a state before the second member 314 separates from the first member 310. For example, the first member 310 can be the case of the 3D imaging apparatus 100. The first member 310 can include a left-eye lens unit 311, a right-eye lens unit 312, an actuator 313, and a power device (not shown).

The left-eye lens unit 311 captures a left-eye image, the right-eye lens unit 312 captures a right-eye image, and the 3D image, which is a combination of the captured left-eye image and the captured right-eye image, is displayed through the 3D imaging apparatus 100. The actuator 313 moves at least one of the left-eye lens unit 311 and the right-eye lens unit 312.

The second member 314 may be the sliding unit 130 of FIG. 1B.

A housing space 315 is formed in the second member 314. Any one of a power unit, a condenser, a circuit device, and a memory card slot unit can be placed in the housing space 315. The first member 310 includes a first region 316 and the second region 317. The first region 316 includes the left-eye lens unit 311, the right-eye lens unit 312, and the actuator 313. The second region 317 includes the second member 314. The second region 317 includes a space for moving at least one of the left-eye lens unit 311 and the right-eye lens unit 312.

In FIG. 2, the second member 214 separates from the first member 210 to the right based on the rear side of the 3D imaging apparatus 100 and the right-eye lens unit 212 moves. By contrast, in FIG. 3, the second member 314 separates from the first member 310 to the left and the left-eye lens unit 311 moves. The separation to the right and the separation to the left can be changed according to the angle viewing the 3D imaging apparatus 100.

FIG. 3B is a diagram illustrating a sectional view of the 3D imaging device after the second member is moved away from the first member.

FIG. 3C is a diagram illustrating sectional view of the 3D imaging device when the right-eye lens unit moves after the second member is moved away from the first member.

Referring to FIGS. 3A, 3B, and 3C, when the second member 314 moves away from the first member 310 and the space 317 is secured, the left-eye lens unit 311 moves into the secured space and thus the distance between the left-eye lens unit 311 and the right-eye lens unit 312 can be adjusted.

The disparity of the images obtained by the left-eye lens unit 311 and the right-eye lens unit 312 can be regulated using the adjusted distance. The 3D image obtained by the 3D imaging apparatus 100 with the space for moving the left-eye lens unit 311 can reduce the fatigue and increase the natural 3D effect of the 3D image. The 3D imaging apparatus 100 can be miniaturized by separating the second member 314 from the first member 310 only as necessary for operations of the 3D imaging apparatus 100.

FIGS. 4A and 4B are diagrams illustrating yet another 3D imaging apparatus in which a second member 414 separates and moves from a first member 410 according to an embodiment of the invention.

Figure 4:
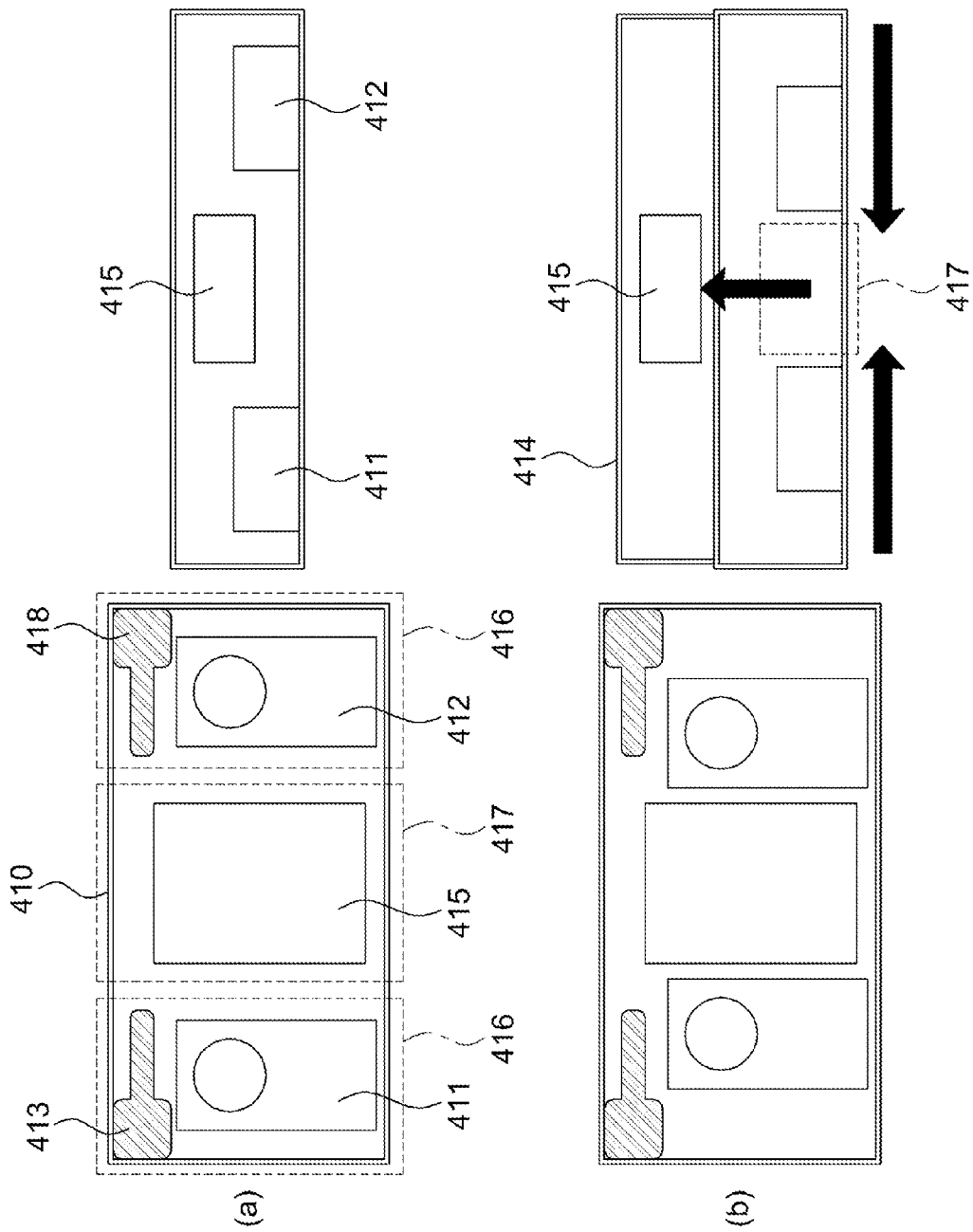
FIGS. 4A and 4B are diagrams illustrating yet another 3D imaging apparatus in which a second member separates and moves from a first member according to an embodiment of the invention.

Unlike FIG. 2, a housing space 415 of FIG. 4 is located in the middle of the 3D imaging apparatus 100. The first member 410 includes a left-eye lens unit 411, a right-eye lens unit 412, a left-eye actuator 413, and a right-eye actuator 418.

The left-eye actuator 413 controls the movement of the left-eye lens unit 411, and the right-eye actuator 418 controls the movement of the right-eye lens unit 412. The first member 410 includes a first region 416 and a second region 417. The first region 416 includes the left-eye lens unit 411 and the right-eye lens unit 412. The second region 417 includes the housing space 415.

FIG. 4A is a diagram illustrating a sectional view of the 3D imaging apparatus in a state before the second member separates from the first member. FIG. 4B is a diagram illustrating a sectional view of the 3D imaging apparatus after the second member separates from the first member.

The second member 414 is located at a rear of the 3D imaging apparatus 100, and can move in a forward direction away from the first member 410.

Referring to FIG. 4B, when the second member 414 is separated, the space of the second region 417 can be secured. At least one of the left-eye lens unit 411 and the right-eye lens unit 412 can move into the secured second region 417. For example, the second member 414 can move in parallel with the direction interconnecting the left-eye lens unit 411 and the right-eye lens unit 412. The second member 414 can move perpendicularly to the direction interconnecting the left-eye lens unit 411 and the right-eye lens unit 412. More specifically, the vertical direction can be an optical direction of the left-eye lens unit 411 or the right-eye lens unit 412, or the forward, backward, downward, or upward direction based on the rear side of the 3D imaging apparatus 100. The horizontal direction can be a direction perpendicular to the optical direction of the left-eye lens unit 411 or the right-eye lens unit 412, or the lateral direction based on the rear side of the 3D imaging apparatus 100. The horizontal direction refers to the second member 414 moving away from the first member 410 to the lateral side or the both sides based on the rear side of the 3D imaging apparatus 100, and the vertical direction refers to the second member 414 moving away from the first member 410 to the forward, backward, downward, or upward side based on the rear side of the 3D imaging apparatus 100.

For example, when the second member 414 moves forward, the middle part of the first member 410 can be the second region 417 and both sides of the first member 410 can be the first region 416. When the second member 414 moves away from the first member 410 and the space is secured, at least one of the left-eye lens unit 411 and the right-eye lens unit 412 moves into the secured space and thus the distance between the left-eye lens unit 411 and the right-eye lens unit 412 can be adjusted. The disparity of the images obtained by the left-eye lens unit 411 and the right-eye lens unit 412 can be regulated using the adjusted distance.

The 3D image obtained by the 3D imaging apparatus 100 with the space for moving the left-eye lens unit 411 can reduce the fatigue and increase the natural 3D effect of the 3D image.

The 3D imaging apparatus 100 can be miniaturized by moving the second member 414 from the first member 410 only as necessary for operations of the 3D imaging apparatus 100.

Figure 5:
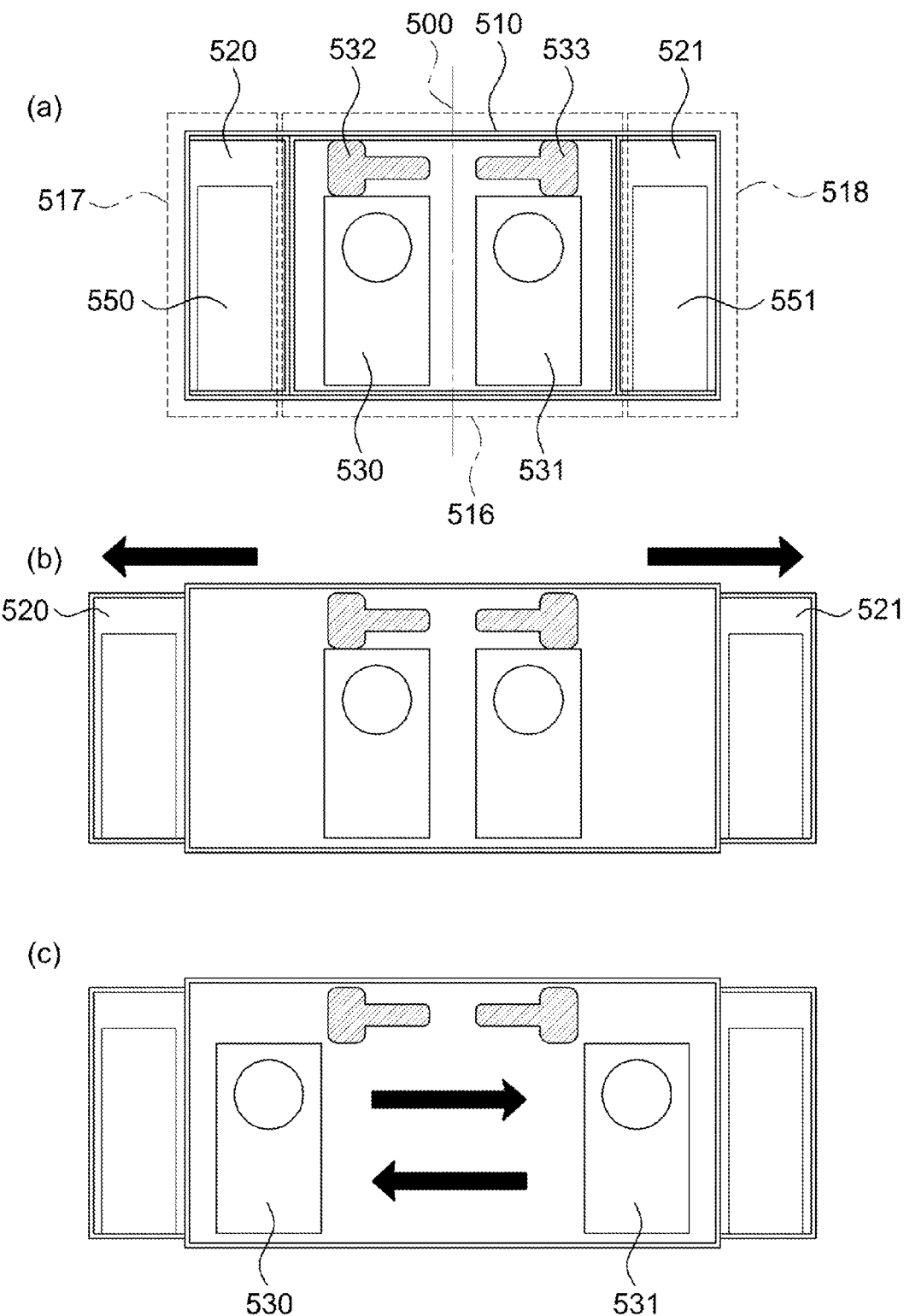
FIGS. 5A, 5B, and 5C are diagrams illustrating a 3D imaging apparatus in which second members split in opposite directions based on a center line of a first member according to an embodiment of the invention.

FIGS. 5A and 5B are diagrams illustrating a 3D imaging apparatus in which second members 520 and 521 split in opposite directions based on a center line of a first member according to an embodiment of the invention.

FIG. 5A is a diagram illustrating a sectional view of the 3D imaging apparatus in a state before the second members separate from the first member.

Referring to FIG. 5A, for example, a first member 510 is the case of the 3D imaging apparatus 100. The first member 510 includes a left-eye lens unit 530, a right-eye lens unit 531, a left-eye actuator 532, and a right-eye actuator 533. Second members 520 and 521 include a second left-eye member 520 and a second right-eye member 521. The left-eye actuator 532 controls the movement of the left-eye lens unit 530, and the right-eye actuator 533 controls the movement of the right-eye lens unit 531. The control unit 140 controls at least one of the left-eye lens unit 530 and the right-eye lens unit 531 using the left-eye actuator 532 and the right-eye actuator 533. The first member 510 includes a first region 516 and second regions 517 and 518. The first region 516 includes the left-eye lens unit 530, the right-eye lens unit 531, the left-eye actuator 532, and the right-eye actuator 533. The second regions 517 and 518 include a second left-eye region 517 and a second right-eye region 518. The second left-eye region 517 includes the second left-eye member 520, and the second right-eye region 518 includes the second right-eye member 521. The second region 217 includes a space for moving at least one of the left-eye lens unit 530 and the right-eye lens unit 531.

Since at least one of the left-eye lens unit 530 and the right-eye lens unit 531 moves from the first region 516 to the second region 517 and 518, a shaft (not shown) can be placed across a part of the first region 516 and a part of the second regions 517 and 518.

As the second members 520 and 521 are formed on both sides of a center line 500 of the first member 510, the second left-eye member 520 can move to the left of the center line 500 of the first member 510 and the second right-eye member 521 can move to the right of the center line 500 of the first member 510.

More specifically, the left-eye lens unit 530 and the right-eye lens unit 531 are located on each side of the center line 500 of the first member 510, and at least one of the left-eye lens unit 530 and the right-eye lens unit 531 can move away from the center line 500 of the first member 510.

The second left-eye member 520 includes a housing space 550 for mounting components in the 3D imaging apparatus 100. The second right-eye member 521 includes a housing space 551 for mounting components in the 3D imaging apparatus 100. The second left-eye member 520 and the second right-eye member 521 may include the housing spaces 550 and 551 respectively, or, according to an alternative embodiment of the present invention only one of the second left-eye lens unit 530 and the second right-eye lens unit 531 may include a housing space 550 or 551.

The control unit 140 controls the movement of the second left-eye member 520 and/or the second right-eye member 521, and controls at least one of the second left-eye member 520 and the second right-eye member 521 to move towards/away from the center line 500 of the first member 510.

FIG. 5B is a diagram illustrating sectional view of the 3D imaging device after the second members move away from the first member.

FIG. 5C is a diagram illustrating sectional view of the 3D imaging device when at least one of the left-eye lens unit and the right-eye lens unit moves after the second members and are separated.

Referring to FIGS. 5A, 5B, and 5C, when the second members 520 and 521 move away from the first member 510 and the space is secured, the left-eye lens unit 530 and the right-eye lens unit 531 move into the secured space, and thus the distance between the left-eye lens unit 530 and the right-eye lens unit 531 can be adjusted. The disparity of the images obtained by the left-eye lens unit 530 and the right-eye lens unit 531 can be regulated using the adjusted distance. Since the space for moving the left-eye lens unit 530 and the right-eye lens unit 531 is secured, the 3D image obtained by the 3D imaging apparatus 100 can reduce image fatigue and increase the natural 3D effect of the 3D image.

The 3D imaging apparatus 100 can be miniaturized by moving the second members 520 and 521 from the first member 510 only as necessary for operations of the 3D imaging apparatus 100.

Figure 6:
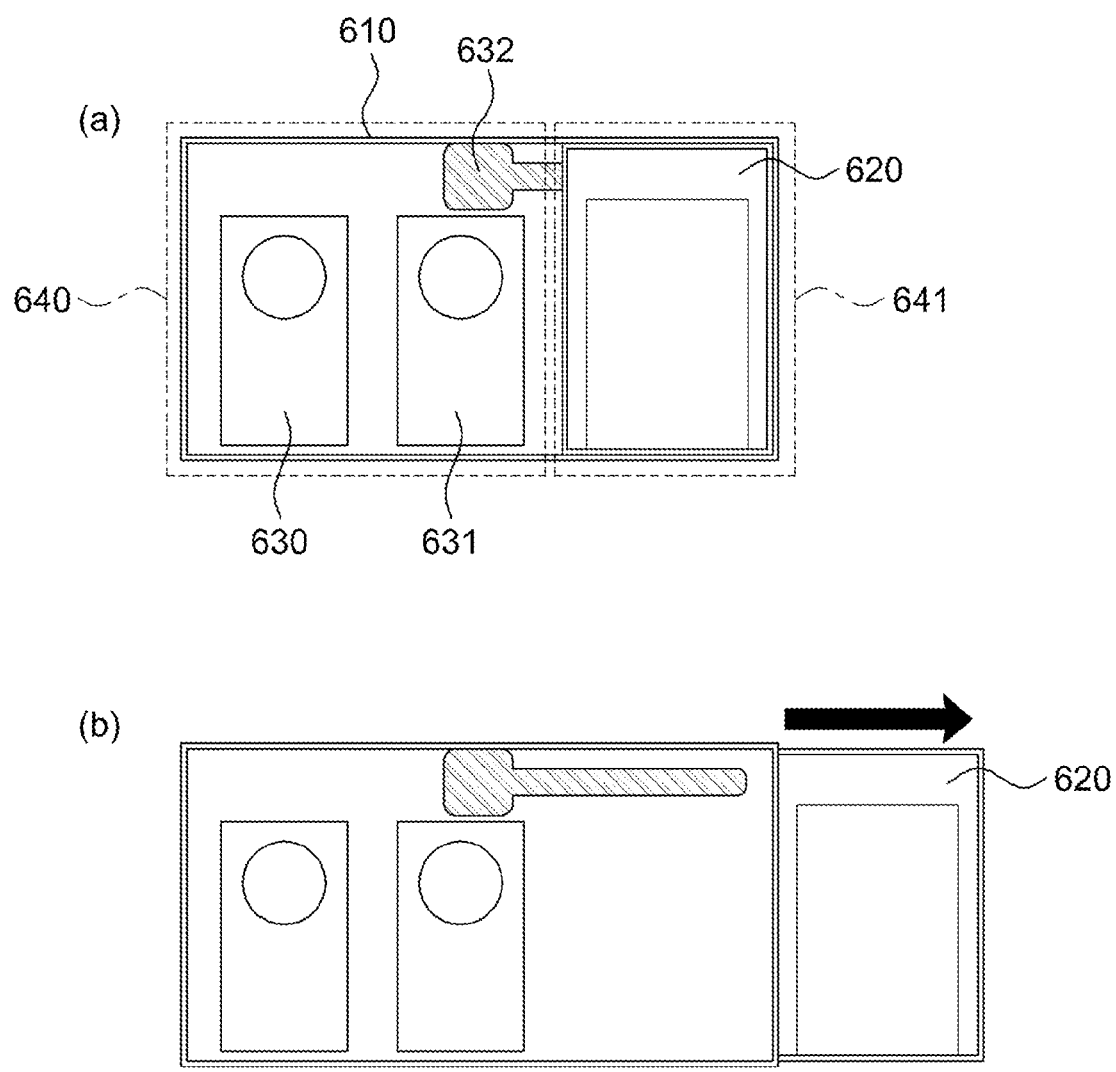
FIGS. 6A and 6B are diagrams illustrating a 3D imaging apparatus in which a second member separates from a first member according to a user's operation according to an embodiment of the invention.

FIGS. 6A and 6B are diagrams illustrating a 3D imaging apparatus in which a second member is separated from a first member according to a user's operation according to an embodiment of the present invention. More specifically, FIG. 6A is a diagram illustrating a sectional view of the 3D imaging apparatus in a state before the second member moves away from the first member. FIG. 6B is a diagram illustrating a sectional view of the 3D imaging apparatus after the second member moves away from the first member.

Referring to FIGS. 6A and 6B, the first member 610 of a 3D imaging apparatus 100 according to an embodiment of the present includes a left-eye lens unit 630, a right-eye lens unit 631, and an actuator 632. The first member 610 includes a first region 640 and a second region 641.

The 3D imaging apparatus 100 may by designed to turn on when the user holds and separates the second member 620 from the first member 610. Similarly, when the user holds and returns the second member 620 to the first member 610, the 3D imaging apparatus 100 can be turned off. When the 3D imaging apparatus 100 can be turned on according to the user's operation, as described above, the right-eye lens 631 can move to a designated driving position. The designated driving position can be one of a position for minimizing the distance between the left-eye lens unit 630 and the right-eye lens unit 631, a position for maximizing the distance, and a middle position between the position of the minimum distance and the position of the maximum distance.

When the second member 620 moves back into the second region 641, at least one of the left-eye lens unit 630 and the right-eye lens unit 631 can move to a designated initial position. The initial position can be a position of the minimum distance between the left-eye lens unit 630 and the right-eye lens unit 631.

An operating method of the 3D imaging apparatus 100 including the second member 620 is described as follows. When the user grips and pulls the second member 620 in a direction away from the first member 610, the 3D imaging apparatus 100 turns on and the space for moving the right-eye lens unit 631 is secured.

After the 3D imaging apparatus 100 turns on, the 3D imaging apparatus 100 obtains the disparity of the images obtained through the left-eye lens unit 630 and the right-eye lens unit 631. After the disparity of the images is obtained, the distance for moving the right-eye lens unit 631 is calculated according to the disparity. The 3D imaging apparatus 100 then moves the right-eye lens unit 631 into the secured space by the calculated movement distance and then captures the final image, which is displayed through the display unit. When the user grips and moves the second member 620 back into the first member 610, the 3D imaging apparatus 100 is turned off.

The control unit 140 can control the power on and off of the 3D imaging apparatus 100 according to the user's operation, and regulate the driving position and the initial position by controlling at least one of the left-eye lens unit 630 and the right-eye lens unit 631.

Figure 7:
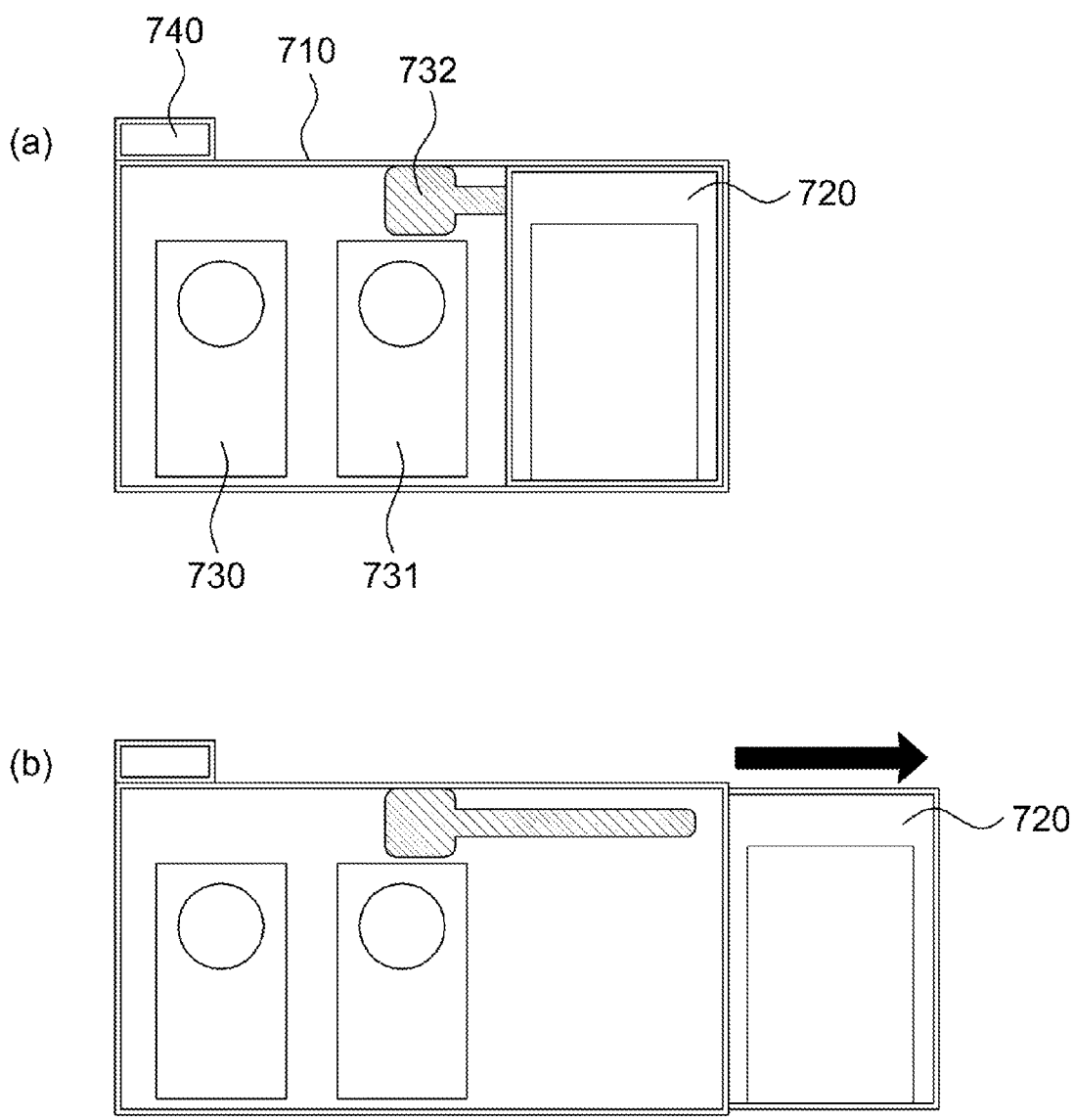
FIGS. 7A and 7B are diagrams illustrating a 3D imaging apparatus in which a second member separates from a first member according to a button according to an embodiment of the invention.

FIGS. 7A and 7B are diagrams illustrating a 3D imaging apparatus in which a second member is separated from a first member according to a button according to an embodiment of the present invention. FIG. 7A is diagram illustrating a sectional view of the 3D imaging apparatus before the second member 720 separates from the first member 710. FIG. 7B is a diagram illustrating a sectional view of the 3D imaging apparatus after the second member 720 separates from the first member 710.

Referring to FIGS. 7A and 7B, the first member 710 includes a left-eye lens unit 730, a right-eye lens unit 731, an actuator 732, and a driving button 740.

When the driving button 740 is touched, the second member 720 moves away from the first member 710 to secure the space for moving the right-eye lens unit 731. When the driving button 740 is touched again, the second member 720 returns to the first member 710 and the right-eye lens unit 731 can move to the initial position. The initial position can be a position corresponding to the minimum distance between the left-eye lens unit 730 and the right-eye lens unit 731 before the second member 720 is moved.

As described above, the second member 720 moves away from the first member 710 to turn on the 3D imaging apparatus 100 and returns to the first member 710 to turn off the 3D imaging apparatus 100.

The control unit 140 control powering on/off the 3D imaging apparatus 100 according to the touch of the driving button 740, and controls the movement of the second member 740 and movement of at least one of the left-eye lens unit 730 and the right-eye lens unit 731.

An operating method of the 3D imaging apparatus 100 including the second member 720 is described as follows. When the driving button 740 is touched while the 3D imaging apparatus is turned on, the second member 720 moves away from the first member 710 to secure the space for moving the right-eye lens unit 731. After the space is secured, the 3D imaging apparatus 100 obtains the disparity of the images obtained through the left-eye lens unit 730 and the right-eye lens unit 731. Then, the distance for moving the right-eye lens unit 731 is calculated according to the disparity. After the movement distance is calculated, the right-eye lens unit 731 is moved into the secured space according to the calculated movement distance, the 3D imaging apparatus 100 captures the final image, and the final image is displayed through the display unit. When the driving button 740 is touched, the right-eye lens unit 731 returns to its initial position and the second member 740 returns to the first member 710.

FIGS. 8A and 8B are diagrams illustrating a 3D imaging apparatus in which a second member moves away from a first member 810 according to a power on/off according to an embodiment of the present invention. FIG. 8A is a diagram illustrating a sectional view of the 3D imaging apparatus before the second member 820 is separated from the first member 810. FIG. 8B is a diagram illustrating a sectional view of the 3D imaging apparatus after the second member 820 is separated from the first member 810.

Referring to FIG. 8, the first member 810 includes a left-eye lens unit 830, a right-eye lens unit 831, an actuator 832, and a power switch 840. When the power switch 840 is touched, the second member 820 moves away from the first member 810 to secure the space for moving the right-eye lens unit 831. When the power switch 840 is touched again, the second member 820 can return to the first member 810 and the right-eye lens unit 831 can move to its initial position. The initial position can be a position for minimizing the distance between the left-eye lens unit 830 and the right-eye lens unit 831 before the second member 820 is moved. As described above, according to the touch of the power switch 840, the second member 820 can move from the first member 810 to turn on the 3D imaging apparatus 100, and can return to the first member 810 to turn off the 3D imaging apparatus 100. The control unit 140 powers-on/off the 3D imaging apparatus 100 according to the touch of the power switch 840, and controls the movement of the second member 820 and movement of at least one of the left-eye lens unit 830 and the right-eye lens unit 831.

An operating method of the 3D imaging apparatus 100 including the second member 820 is described as follows. When the power switch 840 of the 3D imaging apparatus 100 is touched, the 3D imaging apparatus 100 is turned on and the second member 820 moves away from the first member 810 to secure the space for moving the right-eye lens unit 831. Then, the 3D imaging apparatus 100 obtains the disparity of the images obtained through the left-eye lens unit 830 and the right-eye lens unit 831. After the disparity is obtained, the 3D imaging apparatus 100 calculates the distance for moving the right-eye lens unit 831 according to the disparity and moves the right-eye lens unit 831 into the secured space according to the calculated movement distance. After the right-eye lens unit 831 is moved into the secured space, the 3D imaging apparatus 100 captures the final image, and the final image is displayed through the display unit. When the power switch 840 is touched, the right-eye lens unit 831 returns to its initial position and the second member 820 returns to the first member 810 and the 3D imaging apparatus 100 is turned off.

Figure 9:
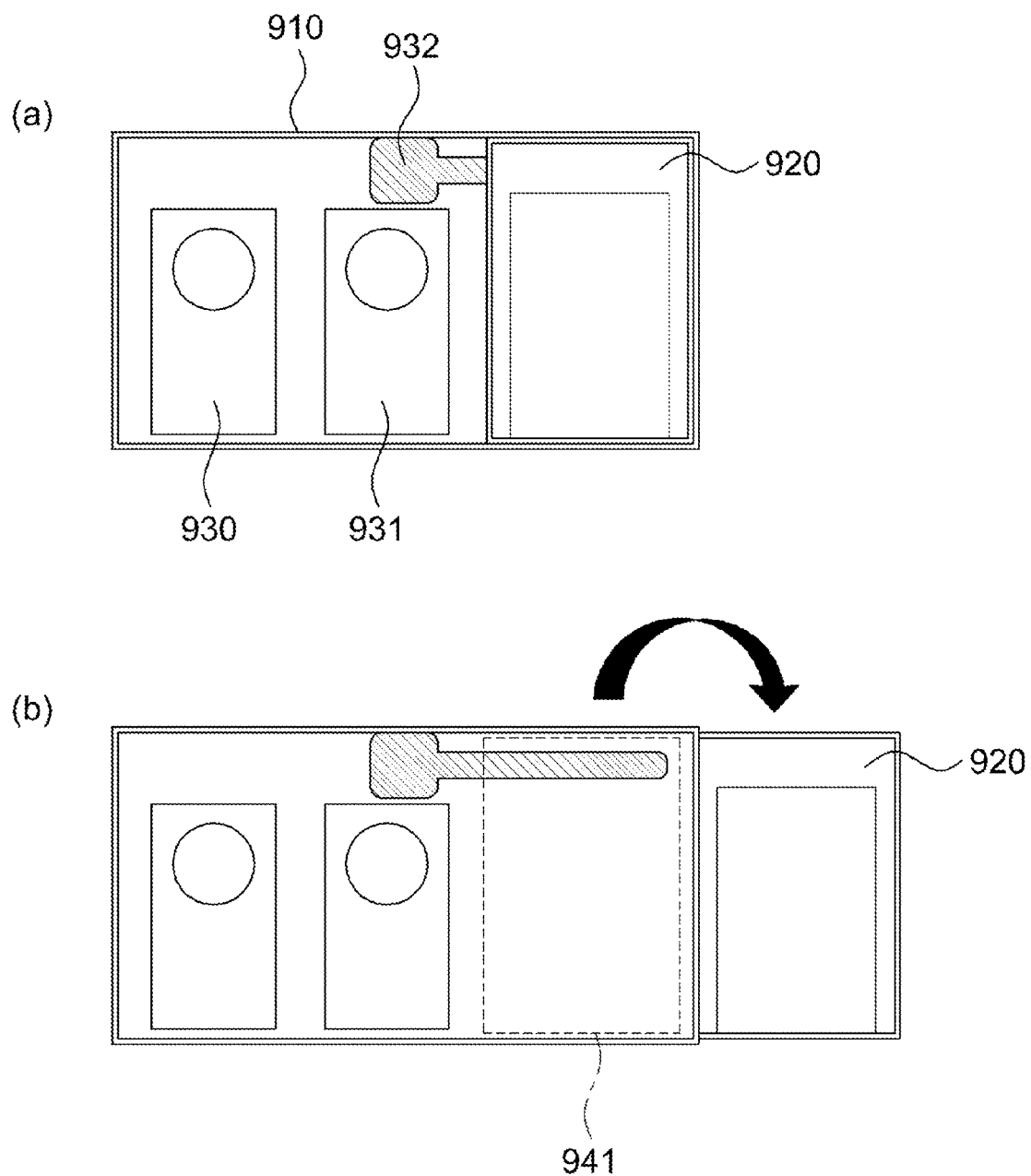
FIGS. 9A and 9B are diagrams illustrating a 3D imaging apparatus in which a second member rotates and moves based on part of a first member according to an embodiment of the invention.

FIGS. 9A and 9B are diagrams illustrating a 3D imaging apparatus in which a second member is rotated and moved based on part of a first member according to an embodiment of the present invention. FIG. 9A is a diagram illustrating a sectional view of the 3D imaging apparatus before the second member is moved in a direction away from the first member. FIG. 9B is a diagram illustrating a sectional view of the 3D imaging apparatus after the second member is moved away from the first member 910.

Referring to FIGS. 9A and 9B, a first member 910 includes a left-eye lens unit 930, a right-eye lens unit 931, and an actuator 932.

The second member 920 rotates based on part of the first member 910 or based on part of a second region 941 and moves away from the first member 910 to secure the space for moving the right-eye lens unit 931. The control unit 140 controls rotation of the second member 920 away from and/or back into the second region 941.

An operating method of the 3D imaging apparatus 100 including the second member 920 is described as follows. When the second member 920 rotates away from the first member 910, the 3D imaging apparatus 100 is turned on and the second member 920 is separated from the first member 910 to secure the space for moving the right-eye lens unit 931. After the space is secured, the disparity of the images obtained through the left-eye lens unit 930 and the right-eye lens unit 931 is obtained. Next, a movement distance for the right-eye lens unit 931 is calculated according to the disparity, and the right-eye lens unit 931 is moved into the secured space according to the calculated movement distance. After the right-eye lens unit 931 is moved, the 3D imaging apparatus 100 captures the final image, and the final image is displayed through the display unit. When the second member 920 rotates with respect to the first member 910 back to its original position, the right-eye lens unit 930 returns to the initial position and the 3D imaging apparatus 100 is turned off.

As described herein, a 3D imaging apparatus according to embodiments of the present invention uses movement of the second member to secure space for moving at least one of the left-eye lens unit and the right-eye lens unit. Therefore, it is possible to reduce the image fatigue of the 3D image acquired by the 3D imaging apparatus and to increase the natural 3D effect of the 3D image.

The 3D imaging apparatus can also be miniaturized by using the movable second member.

Although embodiments of the present invention have been shown and described, it will be appreciated by those skilled in the art that various changes and modification may be made without departing from the principles and spirit of the present invention, the scope of which is defined by the claims and their equivalents.

What is claimed is:

1. A three-dimensional (3D) imaging apparatus comprising:
   a first member including a first region and a second region therein;
   at least one second member movably coupled to the first member such that the at least one second member is movable out of and into the second region;
   a plurality of lens units disposed in the first region while the at least one second member is disposed in the second region,
   wherein, when the at least one second member moves out of the second region, at least one of the plurality of the lens units moves from the first region into the second region.

2. The 3D imaging apparatus of claim 1, wherein, when the at least one second member moves out of the second region, at least one of the plurality of the lens units moves to a designated driving position.

3. The 3D imaging apparatus of claim 2, wherein the driving position is one of a position for minimizing a distance between the plurality of the lens units, a position for maximizing the distance, and a middle position between the position of the minimum distance and the position of the maximum distance.

4. The 3D imaging apparatus of claim 1, wherein, when the at least one second member moves back to the second region, at least one of the plurality of the lens units moves to a designated initial position.

5. The 3D imaging apparatus of claim 4, wherein the initial position is a position for minimizing a distance between the plurality of the lens units.

6. The 3D imaging apparatus of claim 1, wherein at least one of the plurality of the lens units is moved based on a location of an object in an obtained image.

7. The 3D imaging apparatus of claim 1, wherein a housing space is formed in the at least one second member.

8. The 3D imaging apparatus of claim 7, wherein the housing space accommodates at least one of a power unit, a condenser, a circuit device, and a memory card slot unit.

9. The 3D imaging apparatus of claim 1, wherein the at least one second member moves along a path parallel to a movement path of at least one of the plurality of the lens units.

10. The 3D imaging apparatus of claim 1, wherein the at least one second member moves along a path perpendicular to a movement path of at least one of the plurality of the lens units.

11. The 3D imaging apparatus of claim 1, wherein the plurality of the lens units are disposed in both sides of a center line of the first member, and at least one of the plurality lens units moves away from the center line.

12. The 3D imaging apparatus of claim 1, wherein the plurality of the lens units comprises a left-eye lens unit and a right-eye lens unit, and
   at least one of the left-eye lens unit and the right-eye lens unit is moved when the at least one second member moves out of the second region.

13. The 3D imaging apparatus of claim 12, wherein a disparity of a 3D image to be captured by the 3D imaging apparatus is controlled by moving at least one of the left-eye lens unit and the right-eye lens unit.

14. The 3D imaging apparatus of claim 1, wherein the first member includes an actuator and a shaft that extends into the second region.

15. The 3D imaging apparatus of claim 1, wherein the at least one second member is manually movable, the 3D imaging apparatus is turned on when the at least one second member is moved away from the second region, and the 3D imaging apparatus is turned off when the at least one second member is returned into the second region.

16. The 3D imaging apparatus of claim 1, wherein the at least one second member is moved according to on or off state of the 3D imaging apparatus.

17. The 3D imaging apparatus of claim 1, further comprising:
a driving button for controlling movement of the at least one second member with respect the second region,
wherein the at least one second member is moved according to input received through the driving button.

18. The 3D imaging apparatus of claim 1, wherein the at least one second member moves away from and into the second region by rotating with respect to the first member.

19. The 3D imaging apparatus of claim 1, further comprising:
a control unit for controlling the movement of the at least one second member.

20. The 3D imaging apparatus of claim 19, wherein the control unit controls movement of at least one of the plurality of the lens units into the second region when the at least one second member moves out of the second region.

\* \* \* \* \*